UNITED STATES PATENT OFFICE.

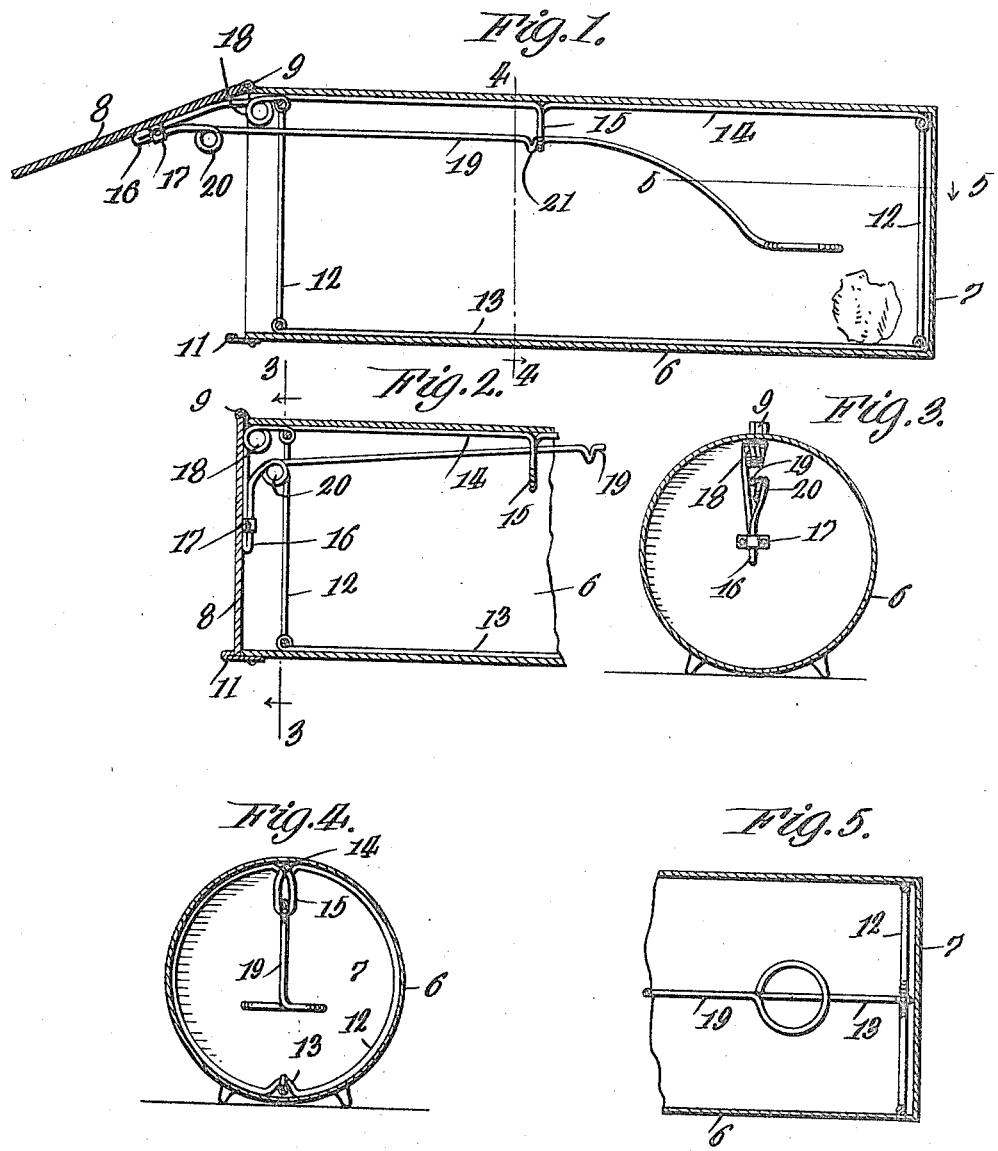
H. V. TREMBLE.
TRAP.
APPLICATION FILED AUG. 14, 1917.
1,261,189.
Patented Apr. 2, 1918.
WITNESSES
Guy M. Spring.
Dwight B. Galt.
INVENTOR
Harry V. Tremble
BY Richard B. Owen.
ATTORNEY

HARRY V. TREMBLE, OF MARSHFIELD, OREGON.

TRAP.

1,261,189.

Specification of Letters Patent.

Patented Apr. 2, 1918.

Application filed August 14, 1917. Serial No. 186,193.

*To all whom it may concern:*

Be it known that I, HARRY V. TREMBLE, a citizen of the United States, residing at Marshfield, in the county of Coos and State of Oregon, have invented certain new and useful Improvements in Traps, of which the following is a specification.

This invention relates to traps, having for its primary object to generally simplify and improve the construction and operation of devices of this character, as well as to increase the efficiency of the same.

A further object of the invention is to provide a trap which shall be of extremely inexpensive construction, which is featured by the lack of complicated mechanism, which is positive in operation, and which may be easily and quickly reset without danger of injury to the hands, fingers, or person of the trapper.

A still further object of the invention is to provide a trap of that character wherein the entrance of an animal to the same causes the trap to be sprung, and which operates so as to kill the animal in a merciful way and without breaking the limbs or crushing the body of the animal and without injuring the hide.

With these objects in view together with others which will appear as the description proceeds, the invention resides in the novel formation, combination and arrangement of parts, all as will be described more fully hereinafter, illustrated in the drawing and particularly pointed out in the claims.

In the drawing:

Figure 1 is a longitudinal sectional view taken through a trap constructed in accordance with the invention, and illustrating the trap in position to receive an animal, Fig. 2 is a similar view of one end of the trap, and illustrating the same sprung, Fig. 3 is a transverse sectional view taken substantially upon line 3—3 of Fig. 2, Fig. 4 is a view similar to Fig. 3, taken upon line 4—4 of Fig. 1, and Fig. 5 is a horizontal sectional view taken on the line 5—5 of Fig. 1.

Referring now particularly to the drawing, 6 indicates the body, shell or casing of the trap, the said casing being formed of any suitable material and being in the present instance of tubular shape. A head 7 closes one end of the tube, while the opposite end of the tube is open. A door 8 is hinged as at 9 at one side of the tube and at the open end thereof, and this door is adapted to be swung over and to close the said open end. It is preferred that the casing and the door therefor be constructed of such material and in such manner that when the door is swung to closed position, the said casing will be air tight. While the casing in the present instance is shown as being of hollow cylindrical form, it will be understood that the invention is not necessarily limited to a casing of this construction, as a rectangular or hexagonal casing may with equal fatality be used. A snap catch 11 holds the door 8 securely in closed position.

Arranged within the casing 6 is a supporting frame, which includes a pair of annular members 12 formed of spring wire, the said annular members being of a diameter equal to the interior diameter of the casing, and being arranged one at each end thereof. These annular members are connected by a longitudinally disposed wire 13, and the frame thus formed assists in strengthening the casing.

The rings 12 are connected at one side of the casing by a longitudinally disposed strand 14 of spring wire, the said wire being coiled about the annular members, as shown, and this wire is bent intermediate its ends to provide a loop 15 extending a short distance radially into the casing. The strand 14 constitutes one end of an elongated wire, the said wire being bent substantially midway its ends to provide a spring-arm portion 16, the latter being secured as by a suitable strap member 17 to the door 8. At the juncture of the angular arm portion 16 with the straight portion 14, a coil 18 is formed, the coil being so made as to force the spring-arm inwardly of the casing and at right angles to the longitudinal wire thereof.

The opposite end of the elongated strand provides a trigger 19, the said trigger being straight for the major portion of its length and being extended within the casing and free for lateral movement therein. The wire strand constituting the trigger 19 is coiled as at 20 adjacent its juncture with the arm 16, and this coil 20 normally exerts pressure upon the trigger 19 to force the latter toward the center of the casing. The trigger arm 19 extends through the loop 15, and at its end is bent downwardly beyond the central point of the casing and adjacent the closed end thereof. At an appropriate place in the length of the trigger 19 a lug 21 is formed, the said lug being provided by bending the arm upon itself, as shown, and this lug catch is positioned in the length of the trigger so that when the said lug is engaged with the wire constituting the loop 15, the door 8 will be swung outwardly to open position. When in this position, the said coil 20 exerts inward pressure upon the trigger, whereby the catch 21 is held behind the wire defining the loop 15. Should the free end of the trigger 19 be moved upwardly, the catch will be moved from engagement behind the wire constituting the loop 15, and the spring coil 18 will then be free to swing the door 8 to closed position.

In operation, the trap is set by moving the door 8 outwardly, it being understood that the coil 20 will force the trigger 19 toward the center of the casing, whereby the said stop 21 will snap over the loop wire 15. The trap may be baited by depositing bait beyond the free end of the trigger, and as an animal enters the trap and attempts to reach the bait, the engagement of his body with the trigger will force the latter upwardly, whereupon the lug 21 will be disengaged from the wire loop 15. Instantly the coil 18 operates to swing the door to closed position, and the door is held tightly locked in closed position by the snap-catch 11. As has been before stated, the casing and the door therefor are so constructed that when the said door is closed, the casing will be air tight, and the animal confined therein will suffocate.

From the foregoing it is obvious that I have provided a trap which is of extremely simple and inexpensive construction, and which will prove thoroughly practical in carrying out the ends for which it is designed. In using a trap of this character, the hide or pelt of the animal captured will not be broken or injured, nor will the body or limbs of the animal be crushed. The trap is designed primarily for the purpose of catching rats, mice and the like, but it is obvious that by varying the size and the strength of the materials, the trap may be employed in catching larger animals.

While the present disclosure is that of what is believed to be the preferred embodiment of the invention, it is to be understood that the invention is not limited thereto, but that various changes in the minor details of construction, proportion, and arrangement of parts may be resorted to if desired, without departing from the spirit of the invention as defined by the appended claims.

What is claimed is:

1. In a trap, a shell having an open end, a door for said end, a frame formed of spring wire in said shell, the said frame being bent to provide a spring arm, the said arm being secured to said door and tending normally to close the same, the free end of said frame beyond said arm extending inwardly from said door, and means on said end for holding said door open against the tension of said arm.

2. In a trap, a casing, a door hinged to one end of said casing, a frame comprising a spring wire bent intermediate its ends to provide a spring arm, the said arm being secured to said door and tending normally to close the same, one end of said wire being secured in said casing, a loop in said wire end, the other end of said wire being free and extending into said casing and through said loop, and a lug on said free end adapted to engage in said loop.

3. In a trap, a casing, a door hinged to one end of said casing, a frame formed of a single strand of spring wire bent midway its ends and forming an arm, one of the ends of said strand being secured in said casing and the other end being free in said casing, a coil in said wire adjacent said arm portion, the said arm being secured to said door and the said coil tending to hold said arm in door-closing position, a second coil in said strand forcing said free end toward the center of said casing, a loop in the fixed length of said strand, the said loop inclosing said free end, and a lug on the said free end adapted to engage within said loop.

4. In a trap, a casing, a door hinged at one end of said casing, a spring wire secured at one end in said casing, the opposite end of said wire being free and provided with a trigger, an arm formed intermediate the ends of said wire and tending normally to hold said door in closed position, and means for releasably holding said trigger end with said door open.

In testimony whereof I affix my signature in presence of two witnesses.

HARRY V. TREMBLE.

Witnesses:
G. W. KAUFMAN,
R. PARKER.

Copies of this patent may be obtained for five cents each, by addressing the "Commissioner of Patents, Washington, D. C."